(12) United States Patent
Lal et al.

(10) Patent No.: US 9,645,167 B2
(45) Date of Patent: May 9, 2017

(54) CALIBRATION APPARATUS, METHODS AND APPLICATIONS

(75) Inventors: Amit Lal, Ithaca, NY (US); Sarvani Piratla, Ithaca, NY (US)

(73) Assignee: CORNELL UNIVERSITY, Ithaca, NY (US)

(*) Notice: Subject to any disclaimer, the term of this patent is extended or adjusted under 35 U.S.C. 154(b) by 733 days.

(21) Appl. No.: 14/112,356

(22) PCT Filed: May 3, 2012

(86) PCT No.: PCT/US2012/036251
§ 371 (c)(1),
(2), (4) Date: Jan. 24, 2014

(87) PCT Pub. No.: WO2012/151360
PCT Pub. Date: Nov. 8, 2012

(65) Prior Publication Data
US 2014/0130570 A1 May 15, 2014

Related U.S. Application Data

(60) Provisional application No. 61/482,852, filed on May 5, 2011.

(51) Int. Cl.
*G01P 21/00* (2006.01)
(52) U.S. Cl.
CPC .................... *G01P 21/00* (2013.01)

(58) Field of Classification Search
CPC ........................................... G01P 21/00
USPC ............................................. 73/1.41
See application file for complete search history.

(56) References Cited

U.S. PATENT DOCUMENTS

| | | | |
|---|---|---|---|
| 7,016,569 B2 | 3/2006 | Mule et al. | |
| 7,031,563 B2 | 4/2006 | Block et al. | |
| 7,066,004 B1 | 6/2006 | Kohler et al. | |
| 7,646,984 B1 | 1/2010 | Ho et al. | |
| 7,747,173 B1 | 6/2010 | Ho et al. | |
| 8,205,497 B1* | 6/2012 | Okandan | G01C 19/5712 73/514.26 |
| 2005/0068633 A1* | 3/2005 | Grenier | G02B 27/0977 359/627 |
| 2007/0295087 A1* | 12/2007 | Umeda | G01P 15/18 73/504.01 |

* cited by examiner

*Primary Examiner* — Paul West
*Assistant Examiner* — Mark A Shabman
(74) *Attorney, Agent, or Firm* — Bond, Schoeneck & King, PLLC; William Greener; Srividya Revuru

(57) ABSTRACT

An inertial sensor calibration method and inertial sensor calibration apparatus. One or more diffraction patterns are generated by one or more fixed and/or moveable gratings (inertial sensors) illuminated by an atomically stabilized source attached to a base and detected by an imager. The grating and/or inertial sensor has a designed parameter value and an actual respective parameter value, such as motion or distance that can be determined upon ultra-precise measurement. Such ultra-precise measurement can be used to calibrate the grating or inertial sensor.

31 Claims, 10 Drawing Sheets

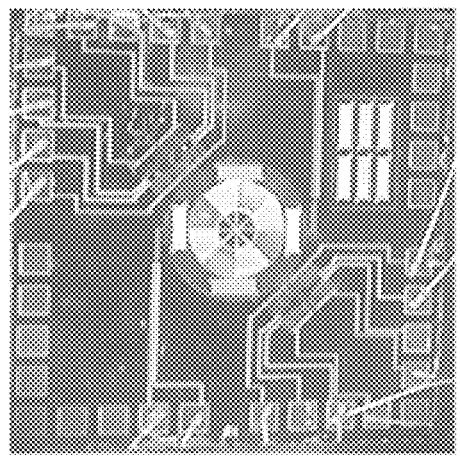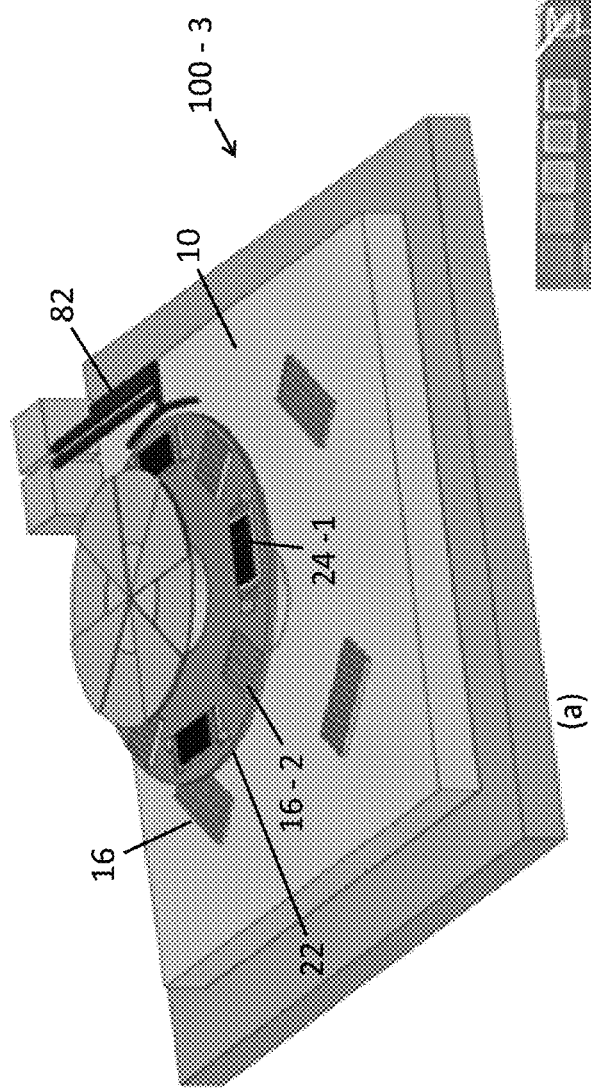
FIG. 8

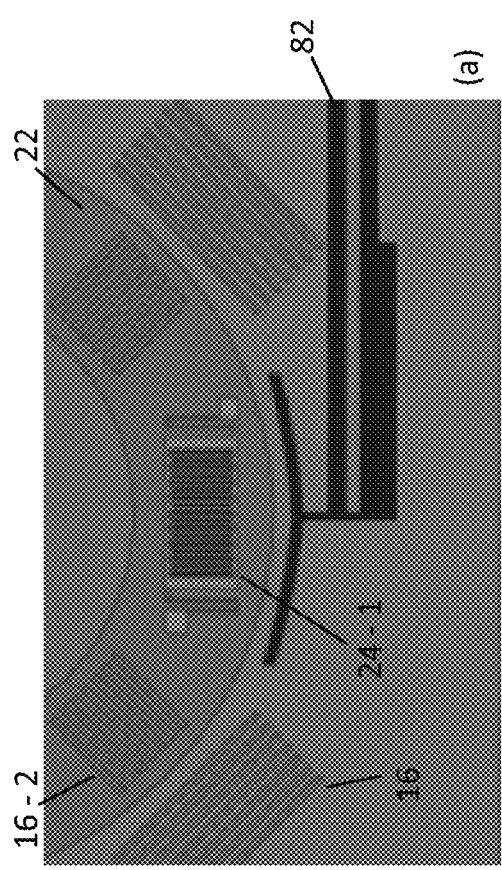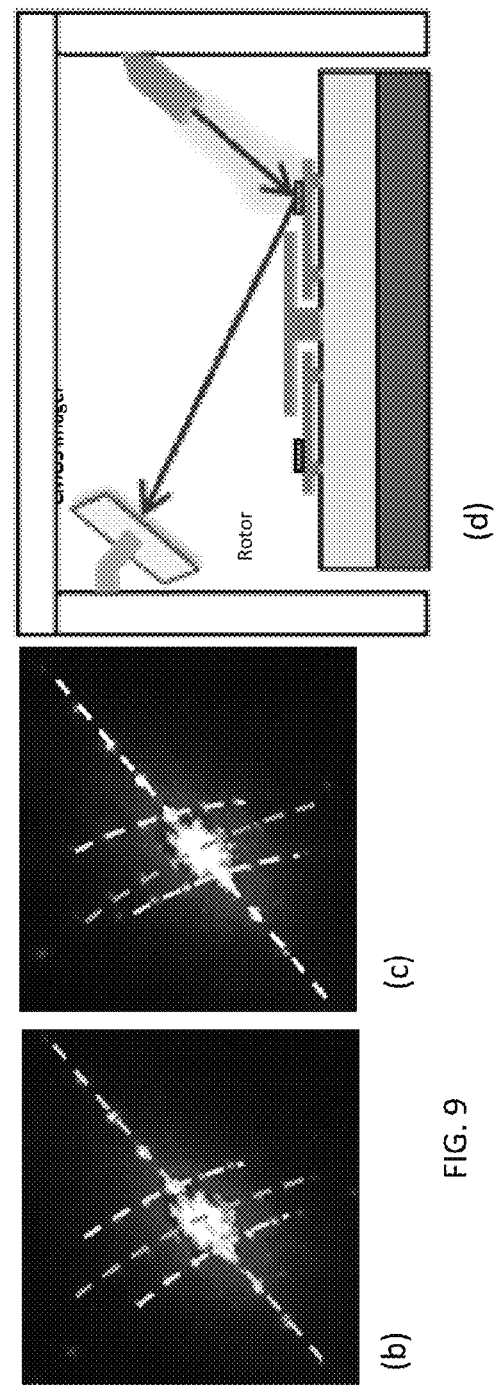
FIG. 9

CALIBRATION APPARATUS, METHODS AND APPLICATIONS

CROSS-REFERENCE TO RELATED APPLICATION

This application is related to, and derives priority from, U.S. Provisional Patent Application Ser. No. 61/482,852 filed 5 May 2011, and titled "ATOMIC STABILIZED OPTICAL APPARATUS, METHODS AND APPLICATIONS," the content of which is incorporated herein fully by reference.

STATEMENT OF GOVERNMENT INTEREST

This invention was funded under DARPA Grant #N66001-08-1-2074 and US Army-DOD (ARMY) Grant #W31P4Q-12-1-0003. The U.S. Government has certain rights in the invention.

BACKGROUND

Field of the Invention

Embodiments of the invention relate generally to calibration and metrology apparatus, methods, and applications. More particularly, embodiments relate to apparatus and methods for calibrating actual parameters such as motion and distance, based on respective design parameters, and metrology, on the nanometer and sub-nanometer scale applied, for example but not limited to, inertial sensors such as accelerometers, grating accelerometers, compass sensors, and gyroscopes. Even more particularly, embodiments pertain to the incorporation and utilization of a modified Nano Optical Ruler Imaging System (NORIS) for said calibration and metrology apparatus and methods.

Description of the Related Art

Micro-machined accelerometers and gyroscopes have revolutionized motion sensing in the commercial world. They have also significantly penetrated the needs of the military for offering navigation for weapons and soldier/vehicle navigation. For most applications though, the sensors have to be complemented with GPS data to enable total inertial sensor based navigation capability. This is because the sensors suffer from biases and scale-factor variations from device to device, and over time. Furthermore, even if one could calibrate the devices after packaging, there are significant scale factor and bias drifts that render the initial calibration ineffective. These drifts occur due to thermally induced creep in packaging and device anchors, environmental vibrations, thermal expansion gradients, electronic noise, shock, and numerous other variables. In particular, when the sensors are placed in weapons which are ejected at high accelerations of >15,000 g, most inertial sensors develop significant bias drifts. Due to the large shocks, or temperature cycling, and the different thermal expansion coefficients of the package layers, stresses onto the small inertial sensors change over time, changing the sensor sensitivity and bias. One way to solve the sensor drift problem is to realize self-calibration techniques directly onto the sensor chip. If one could package a rate table with every sensor, the sensors could be calibrated on-demand. For example, after the sensors are ejected at high accelerations or subjected to repeated temperature cycling, the sensors could be calibrated when they have approached constant velocity or normal operation regime. In the case of pedestrian navigation, the small time during which ZUPTs (zero velocity updates) can be used to reduce effect of bias drifts can also be used to recalibrate the gyro bias, to realize long GPS-denied navigation capability. Provided with such capability, MEMS inertial sensors could truly revolutionize GPS denied navigation for soldiers and weapons, reducing loss of life due to misaim of weapons, and providing a degree of confidence in warfare obtained by knowing where one is at all times. GPS denied navigation is also important for commercial applications such as navigation inside buildings, and between tall buildings in urban environments, where GPS signals cannot be reached.

In the field of inertial sensors, a technique known as carouseling has been historically used to find north for gyro-compassing, and to calibrate the sensors at the same time. Carouseling requires the rotation of the inertial sensor about an axis by 180 degrees. By switching the direction of the gyroscope sensitive axis, the sensitivity of the gyroscope changes to negative of the value in the 180-degree off direction. The bias voltage does not typically change with the angle of orientation, and can be extracted from the two angle readings. The degree to which the bias can be removed depends on the degree to which the angle of rotation can be controlled. If the angle is in error by $\Delta\theta$, then the error in measuring the rotation rate from the gyroscope can be comparable to the bias signal.

Existing carousels used in practice are too big and heavy to be considered for applications such as personal navigation and complementing GPS in automobiles. An insight is that the carousel can itself be made using miniature motion technology such as MEMS actuators themselves.

The inventor has recognized the benefits and advantages of being able to provides solutions to the problems outlined above, particularly by providing apparatus and methods enabling the measurement of distances with parts-per-billion (~50-1000 ppb) accuracy (e.g., ≤5 nm position accuracy over a 100 mm dimensions; <1 arc-second precision angular position knowledge over 360 degree rotation) resulting in atomically stabilized and calibrated inertial sensors. Accelerometer bias (mg after calibration) of less than 0.01 and gyroscope bias (deg/hr after calibration) of less than 0.005 are anticipated to be achievable using the invention. It would be highly advantageous if all of these measurements could be performed in a package that is small (e.g., several cubic centimeters or less and consumes little power.

A MEMS carousel can be implemented in many ways as MEMS fabrication techniques can enable miniature rotating platforms or platforms that move in rectilinear motion on the surface of a chip. Thermal, electrostatic, or piezoelectric actuators, for example, can be used to move the platform.

Kohler et al. U.S. Pat. No. 7,066,004 discloses an inertial measurement unit using rotatable MEMS sensors. As disclosed therein, there is a desire within the art to incorporate MEM (microelectromechanical) inertial sensors into an inertial sensor system due to the potential size, weight, and cost savings. However, due to the relatively poor bias stability of currently available MEM inertial sensors (e.g. on the order of 50 degree/hr, this has not been possible in applications of sensor systems that require an accuracy greater than what currently available MEM sensors can provide. Poor bias stability, also referred to as drift, can lead to errors in the sensor's output, thus yielding errors in the calculated position, or calculated orientation, of a moving body to which the MEM inertial sensor is attached. The '004 patent describes a bias-compensated MEM inertial sensor, sensor system (inertial measurement unit (IMU)), and a method for bias error compensation of a sensor under a dynamic operating condition, in which means are provided for electrically assessing the MEM sensor. However, electrical means as disclosed, e.g., in the '004 patent, themselves contribute noise that prevents sufficient bias reduction or elimination for current and future applications.

Hence, even though it is feasible to make MEMS sensors onto miniature rotating platforms, it is very crucial to measure the position of the platform with high accuracy. Capacitive feedback on the sensor can provide position data but is prone to errors of electrode placement and movement due to substrate thermal expansion. These are the same sources of errors that induce the scale factor drift and biases in inertial sensors to begin with. One way to measure distances and motion accurately is to use optical wavefronts. Optical wavefronts can reflect from or transmit through structures and result in interference fields that can indicate the position of the motion of the structure. For example, a grating on a substrate will reflect a pattern that generates a diffraction pattern that is a Sin c function. A rectangular reflective grating on the rotor-chip will result in a Sin c(x) diffraction pattern at the imager with nodes placed at x=λz/g where λ is the wavelength, z is the gap between the aperture and the imager plane, and g is the grating period. For example, with z equal to 2 mm, λ=850 nm, and g=6 μm, the placement of the first diffraction node will be at x=0.28 mm showing up on the imager plane. The value of z can be estimated from knowing the value of g. Any tilt between the aperture chip and the imager chip can be quantified by the asymmetry of the diffraction pattern measured at the imager chip. As can be seen by the equation above, any changes in the optical wavelength can lead to changes in the pattern as well. If the optical wavelength is fixed, then the other variables are the system dimensions, which can be measured with as much uncertainty as there is in the wavelength stability. Atomic transitions with fixed optical wavelengths can be stable to parts in $10^{10}$. Such atomic transitions are used in the atomic clocks that interrogate hyperfine-transitions in atoms by lasers. Ready-made technology is available to enable a miniature atomically stable laser source, in the form of chip-scale atomic clocks, enabled by the combination of miniature VCSELs and miniature alkali metal vapor cells.

The inventors have recently used the stability of the wavelength to measure the position of a moving object attached to the camera. Co-owned U.S. application Ser. No. 13/062,832 entitled OPTICAL GRID FOR HIGH PRECISION AND HIGH RESOLUTION METHOD OF WAFER-SCALE NANOFABRICATION, the subject matter of which is incorporated herein by reference in its entirety, discloses a wafer-scale nano-metrology system for sensing position of a nanofabrication element using a Nano Optical Ruler Imaging System (NORIS) developed by the instant inventor. Further details about NORIS are described in Yoshimizu et al., *Nanometrology optical ruler imaging system using diffraction from a quasiperiodic structure*, OPTICS EXPRESS, Vol. 18, No. 20 (27 Sep. 2010)), the subject matter of which is incorporated herein by reference in its entirety.

Using NORIS and the stability of the laser, we can measure the position of the rotor with the inertial sensors. The rotor angle and offset are important for inertial sensor characterization, especially for gyro-compassing where the rotor will be rotated by 180 degrees and needs to be at a known angle within an arc-second to achieve ppm bias and scale-factor calculation. To measure the angle of the rotor to 1-arc-second, one must measure the edge-position of a 1 mm radius rotor with <4.84 nm accuracy. A change in the grating average position would translate into a change in the position of the diffraction pattern on the imager, spread over several pixels. By interpolation, the effective resolution of the angle measurement can be very high. One can approximate the measured diffraction patterns with base functions such as polynomials, and cubic splines. The truncation error between the function y=f(x) and the interpolating polynomial $y=P_n(x)$ between (n+1) data points is proportional to the remainder polynomial of the $(n+1)^{th}$ order:

$$|f(x) - P_n(x)| \leq \frac{M_{n+1}}{(n+1)!}|(x-x_l)(x-x_2) \ldots (x-x_n)(x-x_{n+1})|,$$

$$M_{n+1} = \max_{x_1 < x < x_{n+1}} |f^{(n+1)}(x)|$$

Here $M_{n+1}$ is the maximum magnitude of the $n+1^{th}$ derivative of f(x). If the data points are equally spaced with constant step size h, this being the pixel size in the imager, then the local error of the polynomial interpolation $e_n(x)=|f(x)-P_n(x)|$ is bounded as:

$$|f(x) - P_n(x)| \leq \frac{M_{n+1}}{4(n+1)} * h^{n+1}$$

The error decreases if the step size h becomes smaller with a fixed number of data points (n+1). For a typical diffraction pattern such as f(x)=Sin c(kx), the $n^{th}$ derivative at a null point (kx=π) is $$\frac{d^n (\text{Sin}(kx)/kx)}{d^n x} = n\left(\frac{k}{\pi}\right)^n.$$

Using λ=850 nm, g=2 μm, and z=2 mm yields the peak error for a $10^{th}$ order polynomial to be less than $10^{-10}$. The error in position determination from interpolation can be approximated by $$x_{error} = \frac{|f(x) - P_n(x)|}{\frac{df}{dx}},$$

and the error is <1 nm even with a five-degree polynomial fit. Hence, very few exposed pixels are needed to accurately determine the position of the rotor. The resolution of precision of position can also be limited by the number of digital bits used to represent the pixel intensity. This error can be reduced greatly by interpolation and averaging over time with different thresholds for the analog to digital converter.

In addition to knowing the position of the rotor on which the inertial sensor is attached to, it is also possible to read the inertial sensors optically. There have been many implementations of optical readout of motion optically. These methods include interferometric techniques that require precise alignment. Other methods include gratings, in which case the wavelength is not stabilized. In the specific field of inertial sensors there have been attempts to realize optically readout of the proof masks. These techniques have led to the realization that even though the sensors can be made, the long term stability of the sensors suffers much like other miniature inertial sensors, due to drifts in gaps, and no independent standard of nature used to measure these changes.

In addition to measuring motion on the platforms, it is also possible to measure the dimensions of the devices being imaged by interpolating the pattern measured by the imager. In this mode of operation, the stable laser device structure allows in-situ measurement of gaps, masses, and orientation. These measurements can be used in advanced analytical modeling of device performance that can predict the sensitivity and the bias based on learning models. Thus long term stable measurement of a few devices parameters with built in metrology may enable correction of sensor performance.

SUMMARY

An embodiment of the invention is an inertial sensor calibration method. An exemplary method includes the steps of providing a microelectromechanical (MEM) device including a base and at least one inertial sensor physically coupled to the base, having a designed parameter value and an actual respective parameter value upon measurement, which is configured to generate a diffraction pattern upon illumination from a stabilized optical source; providing a stabilized optical source coupled to the base in such a manner that there is no relative movement between the optical source and the base; projecting a stabilized optical source output onto the inertial sensor and generating a diffraction pattern therefrom; detecting the diffraction pattern with one of an electronic image sensor and a light field detector; and using the detected diffraction pattern to measure the actual respective parameter value and to determine a relationship between the designed parameter value and the actual respective parameter value for calibrating the inertial sensor. In all of the embodiments described herein, the term 'fiducial' refers to an internally-fixed reference such as, e.g., a stationary diffraction grating. According to various exemplary, non-limiting aspects, the method may include some or all of the following features or characteristics:
  wherein the designed parameter value and the actual respective parameter value are at least one of a range of motion value and a distance value;
  providing a platform that is moveable with respect to the base, wherein the inertial sensor is disposed on the platform, further wherein the inertial sensor comprises a proof mass that generates the diffraction pattern; providing a fiducial component disposed on the platform within the projected optical source output; providing a fiducial component disposed on the base within the projected optical source output; detecting the diffraction pattern from each of the fiducial components; and using the detected diffraction patterns to determine a relationship between the designed parameter value and the actual respective parameter value for calibrating the inertial sensor;
  propagating the output from the stabilized-output optical source through a beam conditioning component;
  using the relationship between the designed parameter value and the actual respective parameter value to adjust an operating parameter of the MEM device so as to reduce the difference between the designed parameter value and the actual respective parameter value;
  moving the platform in a curvilinear motion;
  moving at least one of the platform and the inertial sensor via a microelectromechanical system actuated by at least one of photonic crystal, opto-thermal, thermal, electrostatic, and piezoelectric actuation;
  providing a braking mechanism to stop and stabilize the moveable platform;
  wherein the inertial sensor is manufacturably integrated in the platform.

An embodiment of the invention is an inertial sensor calibration apparatus. An exemplary apparatus includes a base; a stabilized-output optical source fixedly attached to the base; at least one inertial sensor characterized by a designed parameter value and an actual respective parameter value, coupled to the base; at least two fiducials, wherein at least one of the fiducials is connected to at least one inertial sensor and at least one fiducial is connected to the base; and at least one of an image sensor and a light field sensor disposed to receive diffracted output source light from at least two fiducials. According to various exemplary, non-limiting aspects, the apparatus may include some or all of the following features or characteristics:
  wherein the designed parameter value and the actual respective parameter value are at least one of a range of motion value and a distance value;
wherein the fiducials are diffraction gratings.

An embodiment of the invention is an inertial sensor calibration apparatus. An exemplary apparatus includes a base; a stabilized-output optical source fixedly attached to the base; a platform disposed on the base in an optical path of the source output, wherein the platform is moveable with respect to the base; a grating accelerometer-based inertial sensor (i.e., a diffraction grating including a proof mass) characterized by a designed parameter value and an actual respective parameter value, disposed on the platform in the optical path of the source output; a fiducial component disposed on the platform in the optical path of the source output; a fiducial component disposed on the base in the optical path of the source output; and at least one of an image sensor and a light field sensor disposed to receive diffracted output source light from the grating accelerometer-based inertial sensor, the fiducial component disposed on the platform, and the fiducial component disposed on the base. According to various exemplary, non-limiting aspects, the apparatus may include some or all of the following features or characteristics:
  wherein the designed parameter value and the actual respective parameter value are at least one of a range of motion value and a distance value;
  wherein the platform is a MEM platform and the grating accelerometer-based inertial sensor is manufacturably integrated in the platform.

An embodiment of the invention is an inertial sensor calibration apparatus. An exemplary apparatus includes a base; a stabilized-output optical source fixedly attached to the base; a platform disposed on the base in an optical path of the source output, wherein the platform is moveable with respect to the base; at least one of an inertial sensor and a compass sensor disposed on the platform, wherein the inertial sensor or the compass sensor includes a fiducial that is disposed in the optical path of the source output, further wherein either the inertial sensor and/or the compass sensor is characterized by a designed parameter value and an actual respective parameter value; a fiducial component disposed on the platform in the optical path of the source output; a fiducial component disposed on the base in the optical path of the source output; and at least one of an image sensor and a light field sensor disposed to receive diffracted output source light from the diffraction grating, the fiducial component disposed on the platform, and fiducial component disposed on the base. According to various exemplary, non-limiting aspects, the apparatus of the instant embodiment and the other apparatus embodiments (where appropriate) described herein may include some or all of the following features or characteristics:

wherein the designed parameter value and the actual respective parameter value are at least one of a range of motion value and a distance value;

wherein the stabilized output optical source is an atomically-stabilized source;

wherein the platform is a rotor of an ultrasonic motor;

wherein the platform is a MEM platform;

wherein the platform is moveable in a curvilinear motion;

further comprising a rotatable platform and a rotatable platform drive component;

further comprising a platform brake mechanism;

wherein the rotatable platform drive component is an ultrasonic motor;

wherein the rotatable platform drive component is a MEM actuator selected from the group consisting of: electrostatic actuators, electromagnetic actuators, piezoelectric actuators, shape memory alloy actuators, phase change based actuators, and thermal actuators;

wherein the inertial sensor is one of an accelerometer and a gyroscope;

wherein the inertial sensor is a MEM inertial sense element;

wherein the fiducial components are diffraction gratings;

wherein the image sensor is a CMOS image sensor;

wherein the image sensor is a light-field image sensor;

wherein the at least one of an image sensor and a light field sensor is disposed behind the base;

further comprising an electrical readout mechanism coupled to the base and the sensor.

These and other objects, advantages and benefits provided by embodiments of the invention will now be set forth in detail with reference to the detailed description and the drawing figures and as defined in the appended claims.

BRIEF DESCRIPTION OF THE DRAWINGS

The objects, features and advantages of the embodiments are understood within the context of the Detailed Description of the Embodiments, as set forth below. The Detailed Description of the Embodiments is understood within the context of the accompanying drawings, that form a material part of this disclosure, wherein:

FIG. 8: a) Schematic illustration of an ultrasonically driven motor with integrated grating accelerometers, including a thermal actuator to move a gripper (brake) close to the spinning levitated motor; (b) Optical micrograph of wire bonded device; according to an illustrative, exemplary aspect of the invention;

FIG. 9: (a) close-up view of the fixed and moving gratings on MEM rotor of FIG. 8a; (b, c) show diffraction pattern changing due to rotor motion; (d) schematic of ultrasonic motor, VCSEL, and CMOS imager for optical read out of accelerometer in a package of 10×2×3 cm, according to an illustrative aspect of the invention;

DETAILED DESCRIPTION OF EXEMPLARY EMBODIMENTS

Figure 1:
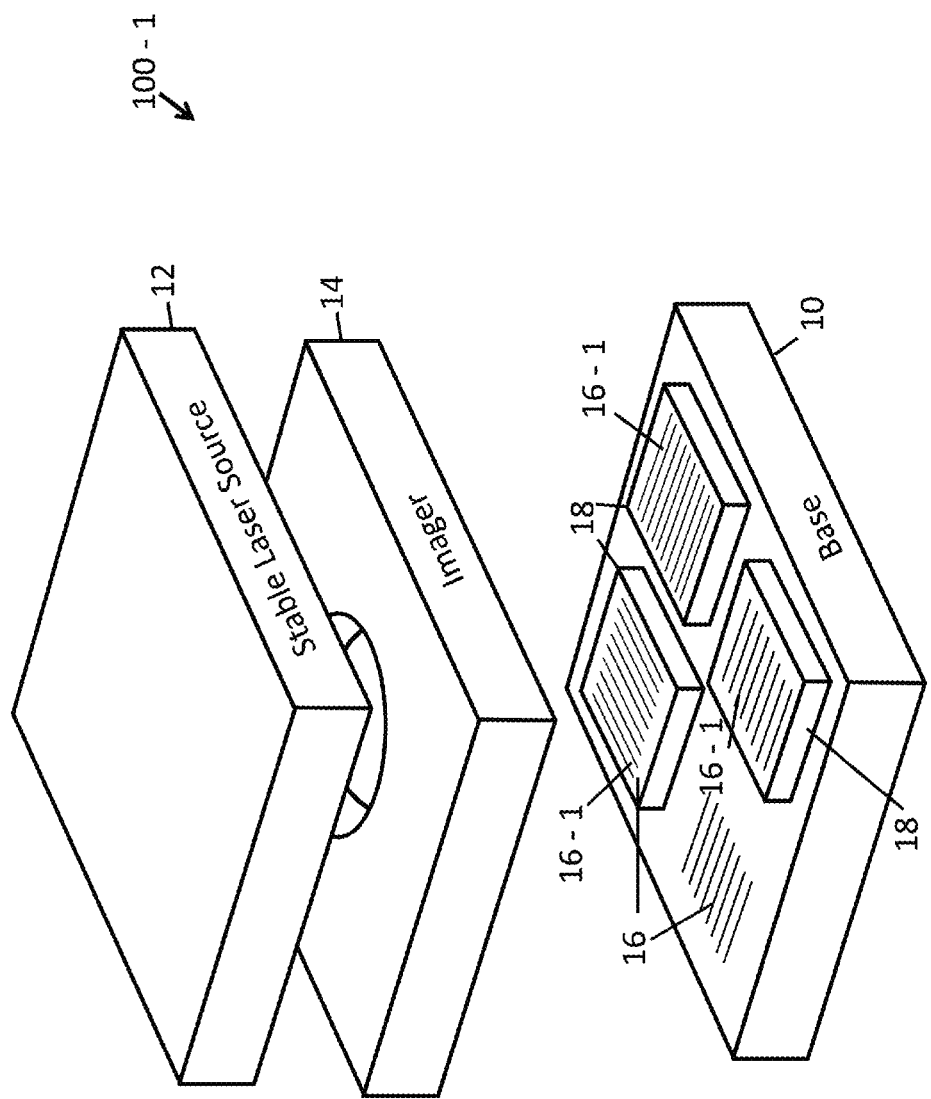
FIG. 1: a) shows a schematic perspective of an inertial sensor calibration apparatus including fixed inertial sensors and bonded or integrated fiducials, used to measure distances with <1 nm accuracy over 2 mm surface (ppm precision); b) cross sectional view of (a), according to an illustrative, exemplary embodiment of the invention.

An exemplary inertial sensor calibration apparatus 100-1 is illustrated in FIG. 1. The principal components of apparatus 100-1 include a base 10, a stabilized-output optical source 12 fixedly attached to the base (see FIG. 1b) so that there is no relative motion between the source and the base, at least one inertial sensor 18 (three shown) characterized by a designed parameter value and an actual respective parameter value, coupled to the base, at least two fiducials 16 (in the form of fixed diffraction gratings (four shown), wherein at least one of the diffraction gratings 16-1 is connected to the at least one inertial sensor 18 and at least one diffraction grating 16 is connected (here, shown integrated) to the base 10; and an imager 14 (either an image sensor or a light-field sensor) disposed above the inertial sensor so as to receive diffracted output source light from at least two diffraction gratings. The designed parameter value and the actual respective parameter value may be either a range of motion value or a distance value.

This and the other exemplary embodiments described herein borrow certain structural components and operational methodology from NORIS, described in the '832 patent and Yoshimizu et al. (id). As in NORIS, the stabilized-output optical source 12 may be a laser stabilized by an atomic transition, which thus produces a constant-of-nature output; i.e., an illumination pattern providing a distance constant-of-nature that will not change over time, with temperature, or with shock and vibration. Stable optical sources can be accomplished in many ways with the wavelength stability and/or accuracy improving as the source volume, power and complexity increase. For example, trapped ion optical standards achieve wavelength uncertainties as low as $10^{-17}$, but are typically the size of a small room. A simple (unstabilized) laser, on the other hand, has a wavelength that varies with temperature, injection current, and strain, and is highly dependent on the fabrication process. The wavelength uncertainty of such a source is about $10^{-3}$. Traditional large-scale atomic optical wavelength references use either co-vibrational transitions in polyatomic molecules ($I_2$, $CH_4$, $C_2H_2$, etc.) or electronic transitions in alkali or alkaline-earth atoms, or ions. Molecular transitions can have very narrow optical linewidths, resulting in good stability and overall uncertainty, but do not lend themselves well to miniaturization because the transitions are very weak. Alkaline earth atoms form the basis for most large-scale modern optical lattice clocks, but require quite high oven temperatures (hundreds of degrees C.) to reach a sufficient atomic density. For a micro-sized, integrated apparatus having demanding simultaneous constraints on size, power and wavelength stability of the optical source, as embodied herein, the saturated absorption spectrum in Rb on the D2 transition (wavelength 780 nm; natural linewidth 6 MHz) or the two-photon transition from the $5s_{1/2}$ state to the $5D_{3/2}$ (wavelength 778 nm, natural linewidth <500 kHz) may provide advantageous sources. The two-photon transition, for example, has been extensively investigated as an optical frequency reference and would provide wavelength stability for nano-calibration as well as for miniaturized optical metrological systems as enabled herein.

While miniaturization of atomically stable lasers continues, an example of a 1 cc system in the form of a Chip-Scale Atomic Clock (CSAC), is commercially available. The system consists of a light source such as a VCSEL, which is incident on a micromachined gas cell of rubidium or cesium vapor. The miniature cell is suspended by tethers to thermally isolate it for low power heating to create metal vapor in cells.

An aperture or other optical component (not shown) may be used to condition the output from the source 12 so that it illuminates all of the intended structures to generate the desired diffraction patterns.

This and the other exemplary calibration apparatus described herein provide for nanometer and sub-nanometer calibration (parts per billion) by illuminating the diffraction gratings of the inertial sensor and on the base with the optical source output to generate diffraction patterns, which, upon detection (see FIGS. 9b, c), can be analyzed, e.g., as described herein above to measure the actual parameter value and to determine a relationship between the designed parameter value and the actual respective parameter value for calibrating the inertial sensor.

Figure 2:
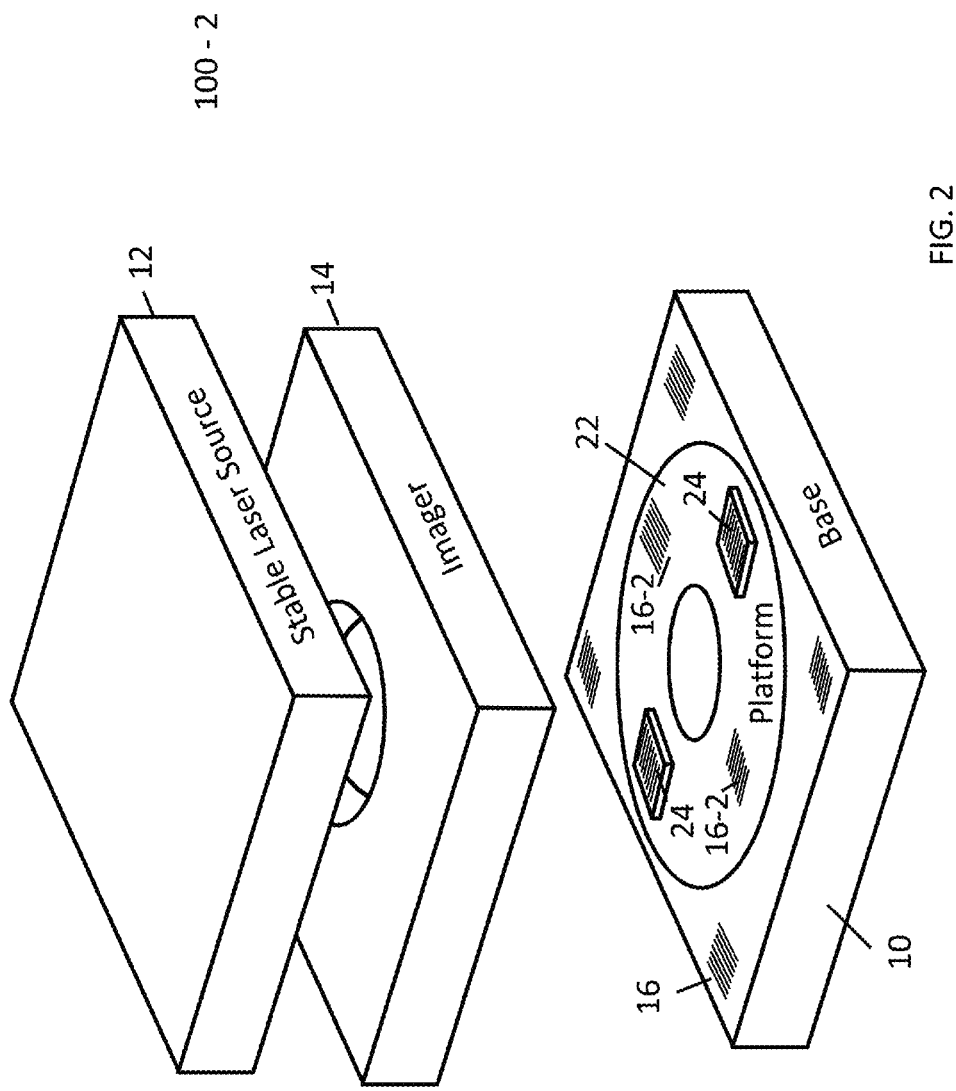
FIG. 2: a) shows a schematic perspective of an inertial sensor calibration apparatus including inertial sensors integrated into a moveable platform and integrated fiducials in the platform and in a base; b) cross sectional view of (a), according to an illustrative, exemplary embodiment of the invention.

Another inertial sensor calibration apparatus 100-2 is illustrated in FIG. 2. The apparatus includes a base 10, a stabilized-output optical source 12 fixedly attached to the base, a platform 22 is moveable with respect to the base, a grating accelerometer-based inertial sensor 24 characterized by a designed parameter value and an actual respective parameter value, disposed on the platform in an optical path (not shown) of the source 12 output; a fiducial component 16-2 disposed on the platform in the optical path of the source output; a fiducial component 16 disposed on the base in the optical path of the source output; and an imager 14 disposed to receive diffracted output source light from the grating accelerometer 24, the fiducial component 16-2 disposed on the platform, and the fiducial component 16 disposed on the base. The platform 22 may be a MEM platform and the grating accelerometer-based inertial sensor 24 may be manufacturably integrated in the platform, as illustrated in FIGS. 7a, b.

Figure 5:
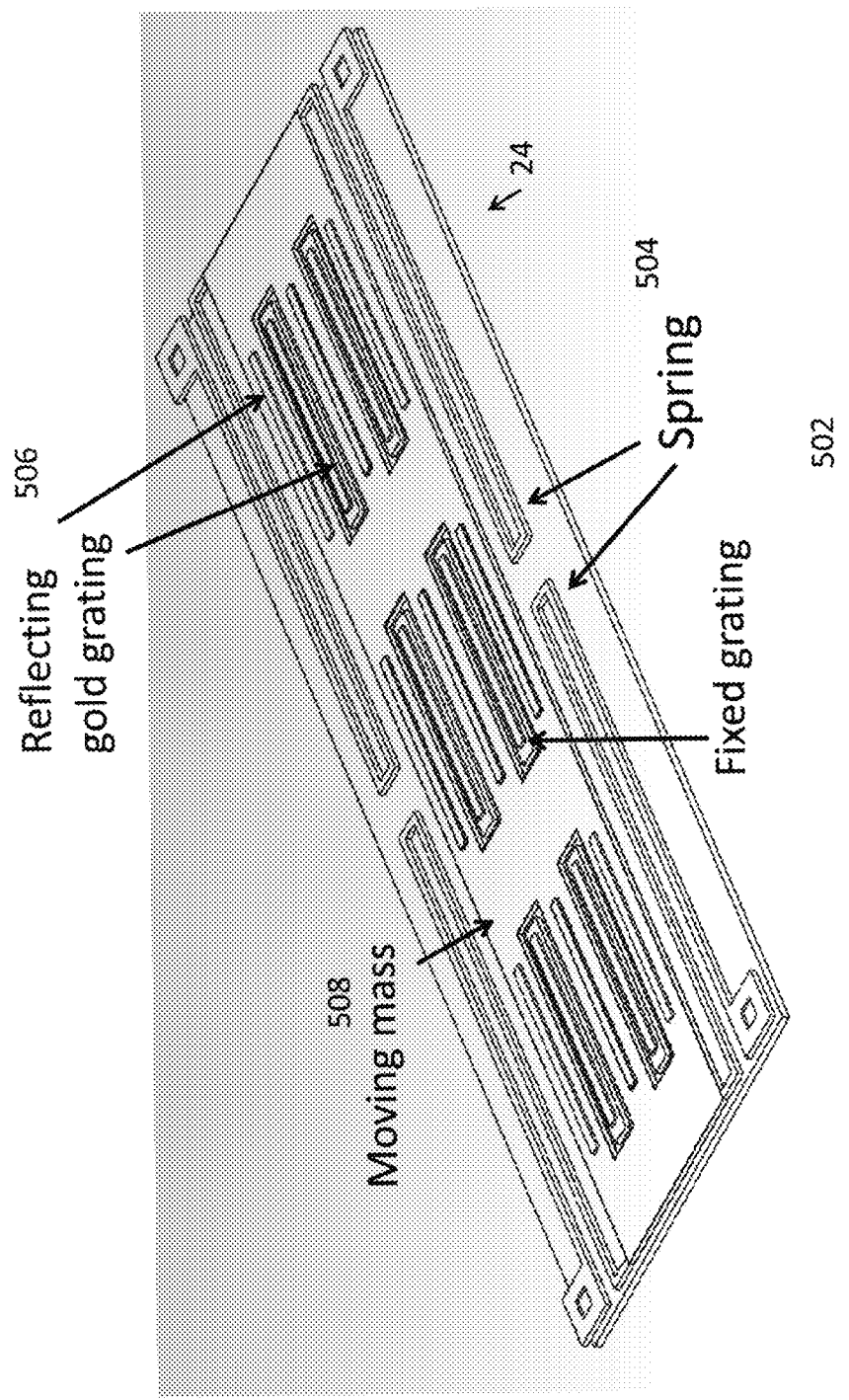
FIG. 5: Schematic illustration of a moveable grating-based inertial sensor ('grating accelerometer') according to an illustrative, exemplary aspect of the invention.
Figure 6:
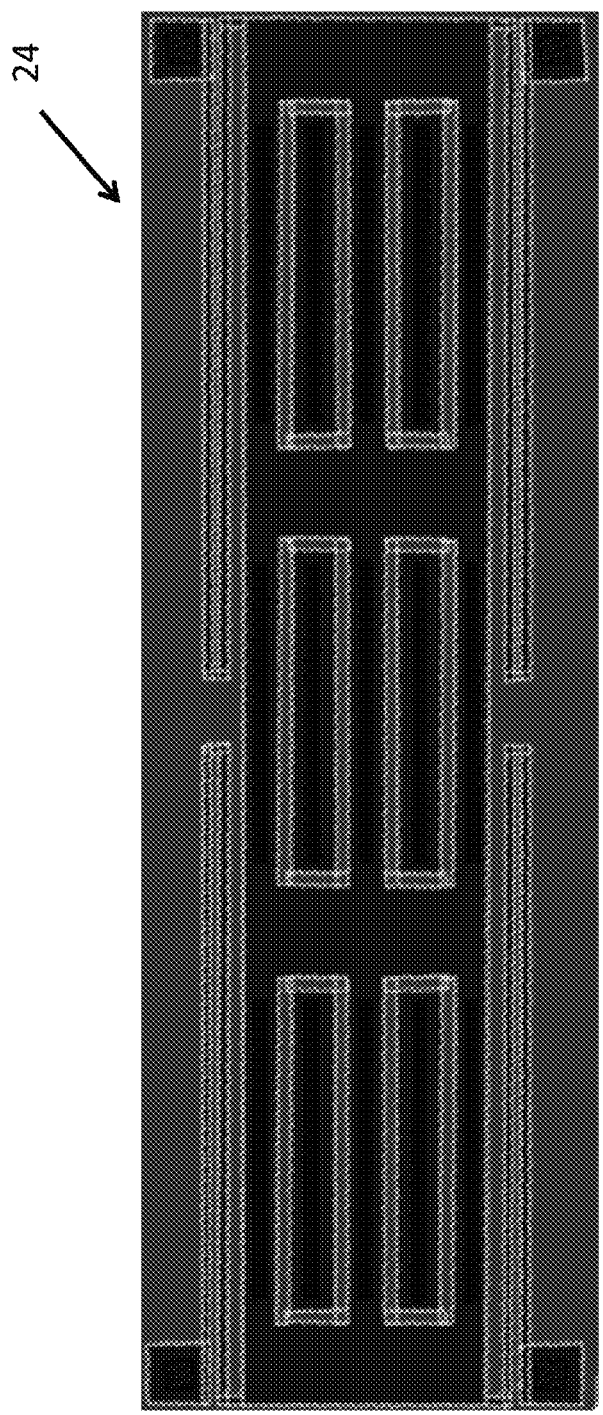
FIG. 6: enlarged view of an actual grating accelerometer of FIG. 5, according to an illustrative, exemplary aspect of the invention.

A schematic example of the grating accelerometer 24 as referred to herein is illustrated in FIG. 5. The grating accelerometer 24 includes a fixed grating structure 502 having gold coating, a proof mass (moving mass) 508, reflecting gold gratings 506 on the proof mass (506 as shown in the figure indicates reflecting gold gratings both on proof mass and fixed mass), and spring 504. FIG. 6 is an enlarged view of the actual grating accelerometer illustrated in FIG. 5, as shown characterized by a mass=4.38E-11 kg, spring constant=0.17 N/m, resonant frequency of 10.151 kHz, acceleration=$mr\omega^2$ (radial), and displacement sensitivity=2.401 nm/g. FIGS. 7a, b are SEMs showing the grating accelerometer integrated into MUMPS process flow in Poly 2 over a Poly 1 rotor, illustrating the movable set of fingers that form one alternating set of grating fingers, and the other set attached to the rotor. As acceleration is applied either from the rotor motion, or to the entire substrate, the gap between the grating and the bottom rotor changes, modifying the reflected or transmitted diffraction pattern from the grating.

Figure 3:
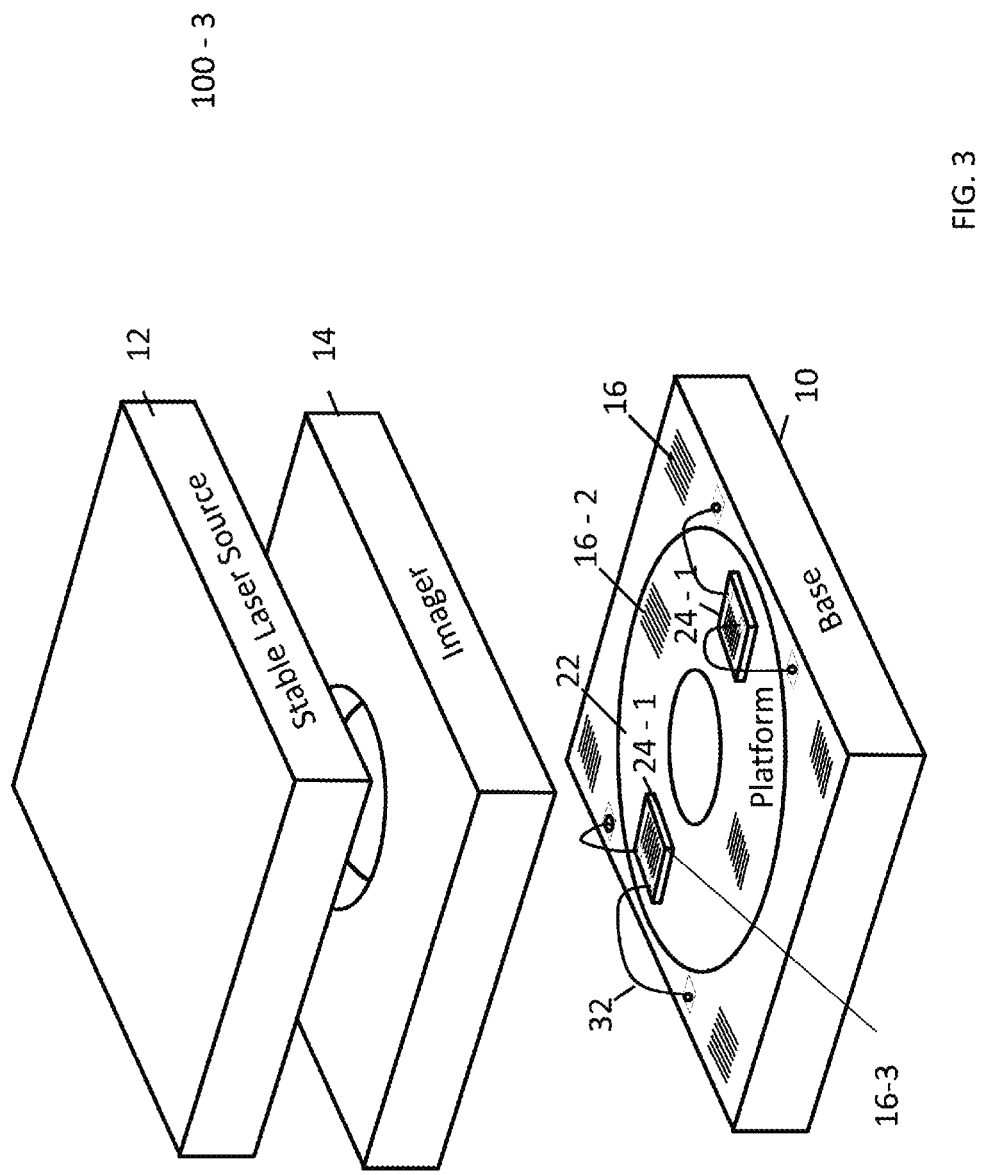
FIG. 3: a) shows a schematic perspective of an inertial sensor calibration apparatus including inertial sensors attached onto a moveable platform, integrated fiducials, and wire bonds to facilitate platform dithering; b) cross sectional view of (a), according to an illustrative, exemplary embodiment of the invention.

Another inertial sensor calibration apparatus 100-3 is illustrated in and/or with reference to FIGS. 3, 8, and 9. The apparatus includes a base 10, a stabilized-output optical source 12 fixedly attached to the base, a platform 22 disposed on the base in an optical path of the source output, wherein the platform is moveable with respect to the base, either an inertial sensor or a compass sensor 24-1 disposed on the platform, wherein the inertial sensor or the compass sensor comprises a fiducial component 16-3 that is disposed in the optical path of the source output, further wherein the inertial sensor or the compass sensor is characterized by a designed parameter value and an actual respective parameter value; a fiducial component 16-2 disposed on the platform in the optical path of the source output; a fiducial component 16 disposed on the base in the optical path of the source output; and at least one image sensor or a light field sensor (14) disposed to receive diffracted output source light from the fiducial component 16-3 disposed on the sensor, the fiducial component 16-2 disposed on the platform, and the fiducial component 16 disposed on the base. Wire bonds 32 are attached between the sensor 24-1 and the base 10 to allow platform dithering as well as capacitive readout in addition to the principal optical calibration technique of the embodied method and apparatus. As herein above, the designed parameter value and the actual respective parameter value are advantageously either a range of motion value or a distance value. As indicated herein above, the fiducials advantageously are fixed diffraction gratings.

FIG. 8a schematically illustrates the overall concept of the inertial sensor calibration platform 100-3, implemented in MUMPS process. The platform 22 is a rotor (thickness of 2 μm, diameter of 980 μm) of an ultrasonically driven motor. Bulk PZT adhesively or solder bonded to the motor is excited at an amplitude of 1-10 $V_{pp}$ near resonance frequencies of the hub-stator ranging from 10 kHz to 10 MHz, some of which are whispering gallery modes. These modes have lower air damping and are thus observed in air at high motion amplitudes. The rotating mode couples shear forces to the air between the stator and the rotor causing a drag force pushing the rotor. This motor couples energy from stator to rotor through an air-fluid bearing through acoustic streaming. We optimized the acoustic coupling by programming gap as a function of theta by adding gold coverage on the stator. The built-in-stress in gold results in bending of the stator and rotor, giving rise to a periodic variation of stator-rotor gap, $g(\theta)=a+b*\sin(n\theta)$, where a is 8.6 μm and b is 5.8 μm for n=2. The bending of the stator allows for seeding of viscous force pattern. Thermal and electrostatic actuators shown in FIG. 8b can move gripper(s) (braking mechanism) 82 towards the spinning rotor to hold it in place during sensor operation, or control its rotation direction and rotation rate (a more detailed description of which can be found in Piratla et al., NANOGAP ULTRASONIC ACTUATOR FOR NON-CONTACT CONTROL OF LEVITATED INERTIAL SENSOR ROTOR (to be published; the content of which is incorporated herein by reference in its entirety)).

Figure 7:
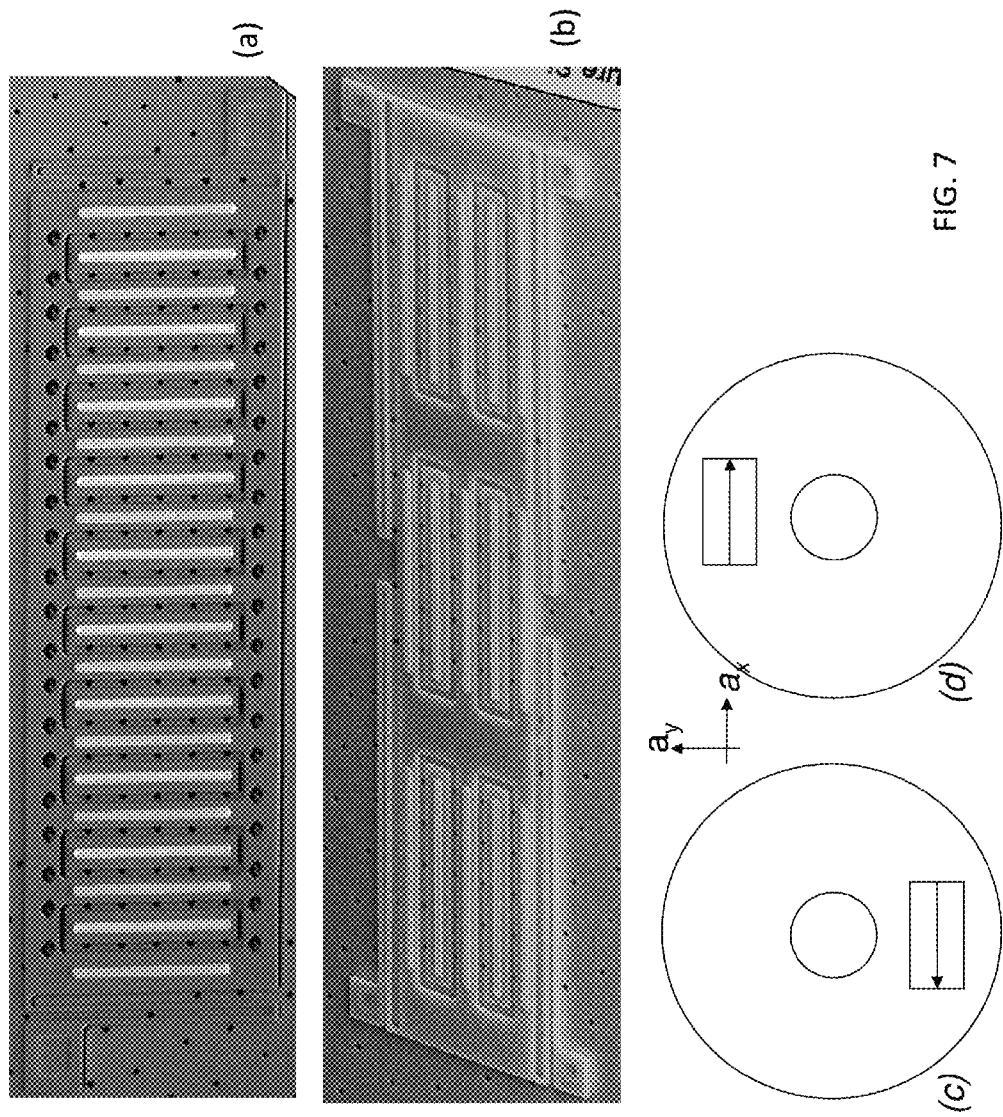
FIG. 7: a) & b) SEM image of a grating accelerometer integration into MUMPS process flow in Poly 2 over a Poly 1 rotor, illustrating a movable set of fingers that form one alternating set of grating fingers, and the other set attached to the rotor, according to an illustrative, exemplary aspect of the invention. As acceleration is applied either from the rotor motion, or to the entire substrate, the gaps between the moving and fixed grating changes, changing the diffraction pattern from the grating.

The rotor 22 includes a plurality of fixed fiducials 16-2 in the form of diffraction gratings and integrated MEM inertial sensing elements in the form of grating accelerometers 24-1. The base 10 includes a plurality of fixed fiducials 16 also in the form of diffraction gratings. Referring also to FIG. 9a for clarity, the fixed diffraction grating fiducials 16 on the base are oriented such that when corresponding fixed diffraction grating fiducials 16-2 disposed on the platform rotate past the base fiducials, the relative grating orientation is either perpendicular or parallel. The grating accelerometers 24-1 also have mutually perpendicular orientations. Although grating accelerometers as shown in FIGS. 5, 6, 7 were custom fabricated sensors made using the PolyMUMPS process and integrated into the platform, inertial sensor elements may be units that are commercially available from various inertial sensor manufacturers.

In the art, bias elimination remains challenging. For example, a Kionix 3-axis accelerometer KXM52 exhibits scale factor and bias drifts of a ~0.5%, corresponding to ~5,000 ppm shifts even after temperature and humidity treatment. One way to eliminate biases is to calibrate the biases actively in the sensor package itself. Micro-scale stable rotating platforms with integrated inertial sensors hold the promise of performing in-situ gyroscope and accelerometer sensor calibration by applying known accelerations and rotation rates. The biases can be measured by measuring signals with sensors at known angles. However, for proper calibration of the inertial sensor scale factor, the rotation of the platform needs to be free of secondary features that can complicate sensor signals. For example, a rotating platform needs to rotate smoothly without actuator artifacts such as jerks. Hence, it is critical to rotate the sensor platform without any physical contact. This is equivalent to suspending the rotor during calibration.

Many previous proofs of principles exist for suspending rotating platforms. Magnetic suspension has been shown using diamagnetic rotors. In the magnetic case, high currents are typically needed to generate sufficient magnetic field gradients for levitation. Electrostatic suspension has been achieved in implementing a gyroscope itself, but relatively high voltages and vacuum are needed to achieve flotation and vacuum operation. An alternative to electromagnetic forces is to use fluidic forces to suspend rotating platforms. An alternative to suspended operation is to use viscous drag forces induced by acoustic and dynamical forces. By actuating a plate at its ultrasonic resonant modes, the resulting acoustic streaming and acoustic radiation forces can be used to levitate the rotor.

Upon illumination from a 650 nm laser VCSEL diode (Thorlabs L650P007), a diffraction pattern was recorded and digitally analyzed. The diffraction patterns from gratings 16 and 16-2 are orthogonal to each other and can be used to measure and calibrate the designed motion and the actual motion the grating accelerometer. The change in the accelerometer grating response is measured as a function of rotation rate.

An optical grating accelerometer was implemented on the rotor with built-in self-calibrating gratings. The accelerometer consists of a set of grating reflecting fingers implemented in MUMPS gold that move in circumferential direction as a result of acceleration with springs. In the middle of the moving fingers are fixed gold reflecting lines. The accelerometer provides diffraction patterns (FIGS. 9b, c) recorded by a CMOS imager (FIG. 9d), with interference between light reflecting from the accelerometer and the fixed gratings.

Figure 4:
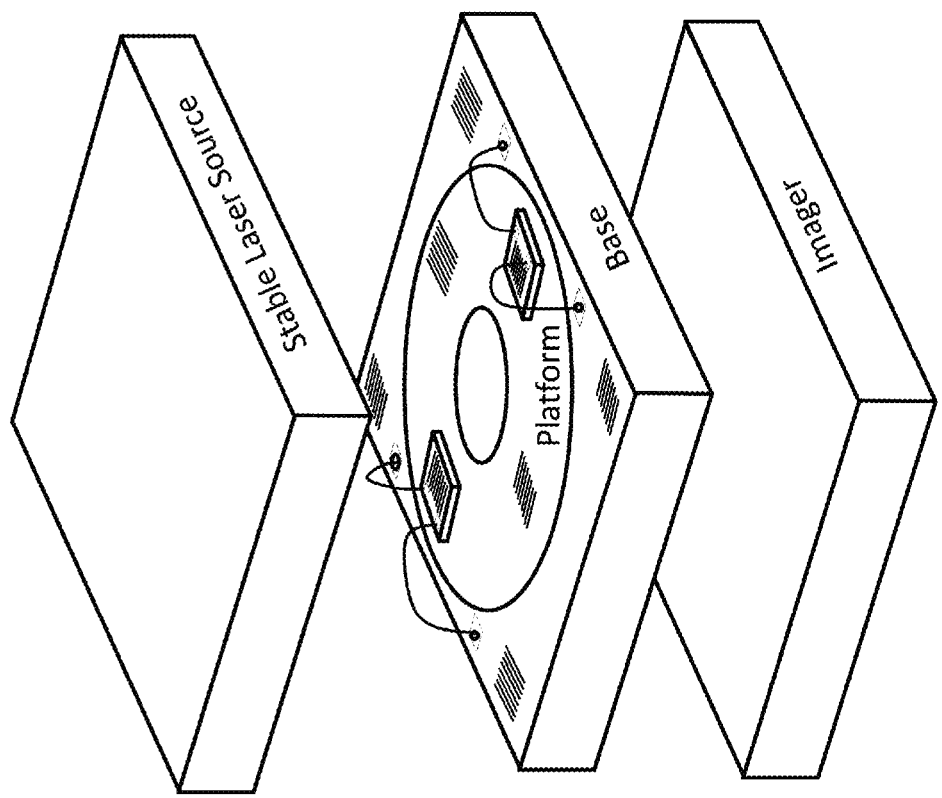
FIG. 4: a) shows a schematic perspective of an inertial sensor calibration apparatus similar to that in FIG. 3, however in a transmission aspect with the imager behind (optically downstream) the base; b) cross sectional view of (a), according to an illustrative, exemplary aspect of the invention.

FIG. 4 shows the apparatus 100-4 similar to apparatus 100-3 of FIG. 3, except that the source output illuminates the gratings and the optical field is transmitted through the structure. The diffracted pattern is measured at the imager plane on the opposite side, behind or below the base. In this case a cavity is created behind the sensors for light to transmit through. Such a cavity can be created in planar silicon substrates using processes such as DRIE (Deep reactive ion etching) or wet anisotropic etching.

Figure 11:
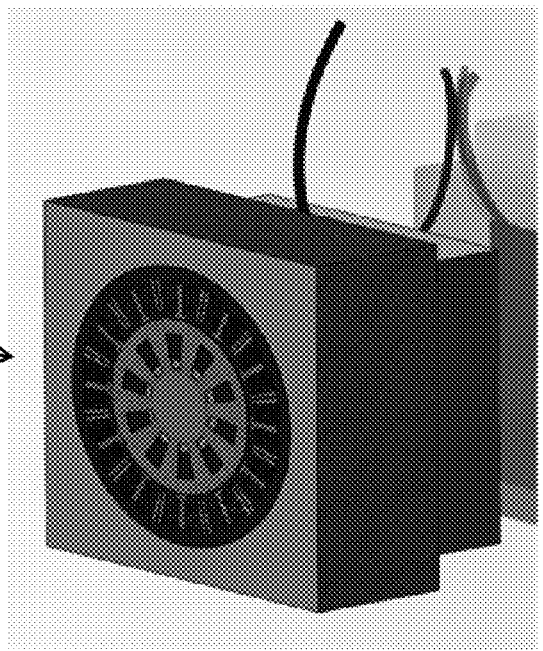
FIG. 11: Schematic illustration of the ultrasonic motor of the inertial sensor system illustrated in FIG. 10.
Figure 10:
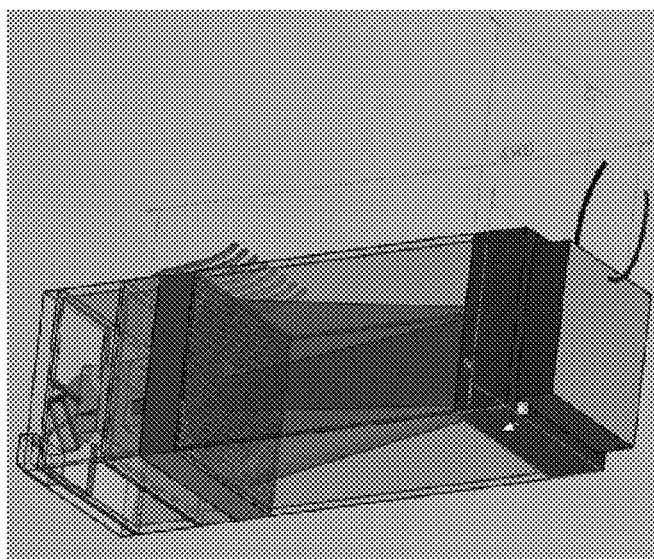
FIG. 10: Schematic perspective of a packaged, self-calibrating inertial sensor system integrated in a vacuum package, according to an illustrative embodiment of the invention.

An embodiment of a packaged, self-calibrating inertial sensor system as embodied herein is illustrated in FIGS. 10 and 11. The overall size of this system can be as small as 2.5×2.5×4 mm to ~1×1×1 cm including the stabilized laser source, imager(s), ultrasonic motor (FIG. 11), inertial sensor(s) and fiducials, base, and electronics. Such a device may be incorporated into portable electronics such as, e.g., cell-phones and GPS receivers. The power consumption of the imager, laser, and the sensor chip will be in the range of only a few, to tens of milliwatts, for a low total power of 10 mw to higher power levels of 100 s of mW. The self-calibration portion of the package, which includes the laser and the imager, can be turned off and used periodically as needed. In this case the rotatable platform could be held in place by normally closed brakes. If the inertial sensors are being used with optical interrogation, the laser will not be turned off. The stabilized laser chip emits the optical beam through an orifice for beam conditioning. The orifice is located within the imager. Typically, imagers are not provided with holes in the center, but can be custom designed such that they will operate even after creating a hole in the center. Traditionally, the wires to access the pixels arranged in a rectangular array are placed in a two-dimensional rectangular grid. However, for an orifice to exist, wires have to be placed to get around the orifice. For this to occur, a special layout of the imager can be done such that the wiring to access the pixels is formed around the orifice. Alternatively, a set of imagers can be concatenated to create an effective orifice. In another aspect, a regular imager can be placed on the sides of the package or on the opposite side of the sensor platform with the sensor platform having orifices to transmit the light. Wires or wirebonds coming off the imager chips provide the power and information lines from the imagers. The light beam is incident on the sensor/rotor chip, from which the light reflects off and is incident on the imagers. The sensor platform is shown with an integrated ultrasonic motor with integrated grating inertial sensors. A PZT platform is shown with two wires for electrical activation. The PZT platform and the sensor platform can be in the size range of 1 mm×1 mm to 3 mm×3 mm. Imager chips of this size can incorporate many pixels as pixel sizes tend to be 1×1 um$^2$ to 10×10 um$^2$ for imager technologies.

All references, including publications, patent applications, and patents cited herein are hereby incorporated by reference in their entireties to the extent allowed and as if each reference was individually and specifically indicated to be incorporated by reference and was set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

We claim:

1. An inertial sensor calibration method, comprising:
   a) providing a microelectromechanical (MEM) device including:
      a base; and
      at least one inertial sensor physically coupled to the base, and a fiducial component being operationally disposed on the at least one inertial sensor, wherein the at least one inertial sensor is characterized by a designed parameter value and an actual respective parameter value upon measurement, which is configured to generate a diffraction pattern upon illumination from a stabilized optical source;
   b) providing a stabilized optical source coupled to the base in such a manner that there is no relative movement between the stabilized optical source and the base;
   c) projecting a stabilized optical source output onto the inertial sensor and generating a diffraction pattern therefrom;
   d) detecting the diffraction pattern with one of an electronic image sensor and a light field detector; and
   e) using the detected diffraction pattern to measure the actual respective parameter value and to determine a relationship between the designed parameter value and the actual respective parameter value for calibrating the inertial sensor.

2. The method of claim 1, wherein the designed parameter value and the actual respective parameter value are at least one of a range of motion value and a distance value.

3. The method of claim 1, further comprising:
   providing a platform that is moveable with respect to the base, wherein the inertial sensor is disposed on the platform,
   further wherein the inertial sensor comprises a proof mass that generates the diffraction pattern;
   providing the fiducial component disposed on the platform within the projected optical source output;
   providing the fiducial component disposed on the base within the projected optical source output;
   detecting the diffraction pattern from each of the fiducial components; and
   using the detected diffraction patterns to determine a relationship between the designed parameter value and the actual respective parameter value for calibrating the inertial sensor.

4. The method of claim 3, further comprising using the relationship between the designed parameter value and the actual respective parameter value to adjust an operating parameter of the MEM device so as to reduce the difference between the designed parameter value and the actual respective parameter value.

5. The method of claim 3, further comprising moving the platform in a curvilinear motion.

6. The method of claim 3, further comprising moving at least one of the platform and the inertial sensor via a microelectromechanical system actuated by at least one of photonic crystal, opto-thermal, thermal, electrostatic, and piezoelectric actuation.

7. The method of claim 3, further comprising providing a braking mechanism to stop and stabilize the moveable platform.

8. The method of claim 3, wherein the inertial sensor is manufacturably integrated in the platform.

9. The method of claim 1, further comprising propagating the output from the stabilized-output optical source through a beam conditioning component.

10. A sensor calibration apparatus, comprising:
    a) a base;
    b) a stabilized-output optical source fixedly attached to the base;
    c) a platform disposed on the base in an optical path of a source output from the stabilized-output optical source, wherein the platform is moveable with respect to the base;
    d) at least one of an inertial sensor and a compass sensor disposed on the platform
    e) a fiducial component disposed on the at least one inertial sensor and compass sensor in the optical path of the source output, further wherein the at least one of the inertial sensor and the compass sensor is characterized by a designed parameter value and an actual respective parameter value;
    f) a fiducial component disposed on the platform in the optical path of the source output;
    g) a fiducial component disposed on the base in the optical path of the source output; and
    h) at least one of an image sensor and a light field sensor disposed to receive diffracted output source light from the fiducial component disposed on the sensor, the fiducial component disposed on the platform, and the fiducial component disposed on the base.

11. The apparatus of claim 10, wherein the designed parameter value and the actual respective parameter value are at least one of a range of motion value and a distance value.

12. The apparatus of claim 10, wherein the stabilized output optical source is an atomically-stabilized source.

13. The apparatus of claim 10, wherein the platform is a rotor of an ultrasonic motor.

14. The apparatus of claim 10, wherein the platform is a MEM platform.

15. The apparatus of claim 10, wherein the platform is moveable in a curvilinear motion.

16. The apparatus of claim 10, further comprising a rotatable platform and a rotatable platform drive component.

17. The apparatus of claim 16, further comprising a platform brake mechanism.

18. The apparatus of claim 16, wherein the rotatable platform drive component is an ultrasonic motor.

19. The apparatus of claim 16, wherein the rotatable platform drive component is a MEM actuator selected from the group consisting of: electrostatic actuators, electromagnetic actuators, piezoelectric actuators, shape memory alloy actuators, phase change based actuators, and thermal actuators.

20. The apparatus of claim 10, wherein the inertial sensor is one of an accelerometer and a gyroscope.

21. The apparatus of claim 10, wherein the inertial sensor is a MEM inertial sense element.

22. The apparatus of claim 10, wherein the fiducial components are diffraction gratings.

23. The apparatus of claim 10, wherein the image sensor is a CMOS image sensor.

24. The apparatus of claim 10, wherein the image sensor is a light-field image sensor.

25. The apparatus of claim 10, wherein the at least one of an image sensor and a light field sensor is disposed behind the base.

26. The apparatus of claim 10, further comprising an electrical readout mechanism coupled to the base and the inertial sensor or compass sensor.

27. An inertial sensor calibration apparatus, comprising:
a) a base;
b) a stabilized-output optical source fixedly attached to the base;
c) a platform disposed on the base in an optical path of a source output from the stabilized-output optical source, wherein the platform is moveable with respect to the base;
d) a grating accelerometer-based inertial sensor characterized by a designed parameter value and an actual respective parameter value, disposed on the platform in the optical path of the source output;
e) a fiducial component disposed on the platform in the optical path of the source output;
f) a fiducial component disposed on the base in the optical path of the source output; and
g) at least one of an image sensor and a light field sensor disposed to receive diffracted output source light from the grating accelerometer-based inertial sensor, the fiducial component disposed on the platform, and fiducial component disposed on the base.

28. The apparatus of claim 27, wherein the designed parameter value and the actual respective parameter value are at least one of a range of motion value and a distance value.

29. The apparatus of claim 27, wherein the platform is a MEM platform and the grating accelerometer-based inertial sensor is manufacturably integrated in the platform.

30. An inertial sensor calibration apparatus, comprising:
a) a base;
b) a stabilized-output optical source fixedly attached to the base;
c) at least one inertial sensor characterized by a designed parameter value and an actual respective parameter value, coupled to the base, the at least one inertial sensor comprising a fiducial component;
d) at least two diffraction gratings, wherein a first diffraction grating of the at least two diffraction gratings is the fiducial component of the at least one inertial sensor and a second diffraction grating of the at least two diffraction gratings is connected to the base; and
e) at least one of an image sensor and a light field sensor disposed to receive diffracted output source light from the at least two diffraction gratings.

31. The apparatus of claim 30, wherein the designed parameter value and the actual respective parameter value are at least one of a range of motion value and a distance value.

* * * * *